United States Patent
Oba (10) Patent No.: US 8,395,493 B2
(45) Date of Patent: Mar. 12, 2013

(54) DATA COMMUNICATION DEVICE, AIR PRESSURE MONITORING SYSTEM USING THEREOF, AND DATA COMMUNICATION METHOD

(75) Inventor: Tomotake Oba, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

(21) Appl. No.: 13/486,298

(22) Filed: Jun. 1, 2012

(65) Prior Publication Data

US 2012/0243639 A1 Sep. 27, 2012

Related U.S. Application Data

(63) Continuation of application No. 12/573,649, filed on Oct. 5, 2009, now Pat. No. 8,212,664.

(30) Foreign Application Priority Data

Oct. 6, 2008 (JP) ................................. 2008-259584

(51) Int. Cl.
*B60C 23/00* (2006.01)
*H04Q 7/20* (2006.01)
(52) U.S. Cl. ..................... 340/447; 340/442; 340/539.1; 445/465; 370/280
(58) Field of Classification Search .................. 340/442, 340/447, 539.1, 539.11, 572.1, 5.6, 5.64; 455/343.2, 444, 445, 465, 503; 607/32, 60; 375/322, 323, 324, 340; 370/280
See application file for complete search history.

(56) References Cited

U.S. PATENT DOCUMENTS

| | | | |
|---|---|---|---|
| 5,361,398 A | 11/1994 | Christian et al. | |
| 5,416,779 A * | 5/1995 | Barnes et al. | 370/280 |
| 6,535,116 B1 | 3/2003 | Zhou | |
| 7,027,773 B1 | 4/2006 | McMillin | |
| 7,327,806 B2 | 2/2008 | Liem et al. | |
| 7,392,092 B2 * | 6/2008 | Li et al. | 607/60 |
| 7,450,533 B2 | 11/2008 | Aoki et al. | |
| 7,453,350 B2 | 11/2008 | Kachouh et al. | |
| 7,583,746 B2 | 9/2009 | Aoki et al. | |
| 7,587,002 B2 | 9/2009 | Aoki et al. | |
| 7,653,394 B2 | 1/2010 | McMillin | |
| 7,664,479 B2 | 2/2010 | Fischer et al. | |
| 7,916,811 B2 * | 3/2011 | Gurney et al. | 375/324 |

FOREIGN PATENT DOCUMENTS

| | | |
|---|---|---|
| JP | 2005-142615 A | 6/2005 |
| JP | 2005-223478 A | 8/2005 |
| JP | 2006-109274 A | 4/2006 |

\* cited by examiner

*Primary Examiner* — Van T. Trieu
(74) *Attorney, Agent, or Firm* — Sughrue Mion, PLLC (57) ABSTRACT

A data communication device includes: an antenna resonance circuit; a detection circuit; an arithmetic processing device; and a first switch. The antenna resonance circuit receives a signal in the ASK (Amplitude Shift Keying) format. The detection circuit demodulates a digital baseband signal based on the reception signal. The arithmetic processing device detects an appearance time of an edge in the demodulated digital baseband signal based on a preamble part of the reception signal. The first switch short-circuits both end of the antenna resonance circuit at first timing in synchronization with the appearance time of the edge.

8 Claims, 9 Drawing Sheets

DATA COMMUNICATION DEVICE, AIR PRESSURE MONITORING SYSTEM USING THEREOF, AND DATA COMMUNICATION METHOD

CROSS-REFERENCE TO RELATED APPLICATIONS

This application is a Continuation of U.S. application Ser. No. 12/573,649 filed Oct. 5, 2009 now U.S. Pat. No. 8,212,664 which claims the benefit of priority from Japanese patent application No. 2008-259584 filed on Oct. 6, 2008. The entire disclosures of the prior applications are incorporated herein by reference.

BACKGROUND OF THE INVENTION

1. Field of the Invention

The present invention relates to a data communication device for receiving a signal in the ASK (Amplitude Shift Keying) format, a vehicle-mounted communication system using thereof, and a data communication method.

2. Description of Related Art

On-vehicle electronics technology has been rapidly developed in recent years. In such a trend, TPMS (Tire Pressure Monitoring System) is applied to tires at about 60 percent currently in the US market and the application thereof is expected to reach 100 percent in the future by legislation to be in force.

Technique related to the TPMS is described in, for example, Japanese Laid-Open Patent Application JP-P2006-109274A (refer to Patent Document 1, corresponding to US2006/079190(A1)).

The TPMS usually uses a LF (low frequency) radio wave such as 125 KHz as a carrier wave which is ASK-modulated by using a digital baseband signal. A signal (hereinafter referred to as transmission radio wave) ASK-modulated is received by a resonance antenna (i.e. antenna resonance circuit) and demodulated by a detection circuit in a data communication device used in the TPMS.

The data communication device determines data "0" and data "1" by analyzing a digital baseband signal demodulated by an arithmetic processing device. If the Manchester encoding method is employed here as a data determining method, the arithmetic processing device determines data "0" in the case where a signal level of a digital baseband signal is in transition from a high level to a low level within one period, and determines data "1" in the case where it is in transition from a low level to a high level within one period.

A technique related to a receiving device which uses Manchester encoded data is disclosed in, for example, Japanese Laid-Open Patent Application JP-P2005-142615A (refer to Patent Document 2).

In order to extract "0" and "1" with high accuracy from a transmission radio wave which is ASK-modulated, it is necessary to demodulate the transmission radio wave into a proper digital baseband signal. However, a data reception error may occasionally occur because a desired digital baseband signal cannot be obtained due to a fluctuation of reception intensity based on a propagation environment such as noise and a voltage fluctuation on a transmission side and/or a reception side.

Moreover, even if a state that a transmission radio wave exists is changed to a state that a transmission radio wave does not exists, when large electric charges are accumulated in the antenna resonance circuit, it takes prolonged time to attenuate the reception intensity in a low level. In this case, if a residual voltage in the antenna resonance circuit is larger than a threshold value, data may be occasionally determined as "1". That is, residual electric charges in the resonance circuit cause reception of "1" even though transmitted data is "0", thereby causing the TPMS to malfunction. It is therefore desired to provide a technique which allows discharge of energy accumulated in the resonance circuit.

For example, a radio wave receiving device for preventing occurrence of a reception error due to noise is disclosed in Japanese Laid-Open Patent Application JP-P2005-223478A (refer to Patent Document 3, corresponding to U.S. Pat. No. 7,369,831 (B2)). The radio wave receiving device according to Patent Document 3 is provided with an antenna short-circuit control means adapted to periodically short-circuit a resonance antenna at predetermined time intervals in order to discharge energy accumulated by a reception signal. Energy accumulated in the resonance antenna can be therefore discharged periodically, so that an attenuation time to attenuate energy accumulated in the resonance antenna can be shortened.

However, we have now discovered the following facts.

In the Patent Document 3, timing to short-circuit the resonance antenna is not determined by taking into consideration a time range of level determination for a reception radio signal. The resonance antenna is also short-circuited several times within a period (here 1S) of a modulation wave. In this case, signal intensity is decreased after passing through a filter as described in Patent Document 3.

Meanwhile, the level determination is carried out at predetermined timing in the case of extracting data "0" and "1" from a signal which is ASK-modulated. Here, if the resonance circuit is short-circuited in the time range of the level determination as taught by the technique according to the Patent Document 3, it is impossible to obtain desired amplitude and there is a danger that a reception error may occur. For example, "0" may be occasionally determined even if a signal corresponding to data "1" is supplied, because a signal level does not exceed a threshold value due to discharge resulting from short-circuit.

SUMMARY OF THE INVENTION

The present invention seeks to solve one or more of the above problems, or to improve upon those problems at least in part.

In one embodiment, a data communication device includes: an antenna resonance circuit; a detection circuit; an arithmetic processing device; and a first switch. The antenna resonance circuit receives a signal in the ASK (Amplitude Shift Keying) format. The detection circuit demodulates a digital baseband signal based on the reception signal. The arithmetic processing device detects an appearance time of an edge in the demodulated digital baseband signal based on a preamble part of the reception signal. The first switch short-circuits both end of the antenna resonance circuit at first timing in synchronization with the appearance time of the edge.

In another embodiment, an air pressure monitoring system includes: a data communication device; and a sensor initiator. The sensor initiator transmits a signal in the ASK (Amplitude Shift Keying) format to the data communication device. The data communication device includes: an antenna resonance circuit, a detection circuit, an arithmetic processing device, and a first switch. The antenna resonance circuit receives the signal in the ASK format. The detection circuit demodulates a digital baseband signal based on the reception signal. The arithmetic processing device detects an appearance time of an edge in the demodulated digital baseband signal based on a preamble part of the reception signal. The first switch short-circuits both end of the antenna resonance circuit at first timing in synchronization with the appearance time of the edge. An air pressure sensor starts to measure air pressure of a tire in response to data based on the demodulated digital baseband signal.

In another embodiment, a data communication method includes: receiving a signal in the ASK (Amplitude Shift Keying) format by an antenna resonance circuit; demodulating a digital baseband signal based on the reception signal; detecting an appearance time of an edge in the demodulated digital baseband signal based on a preamble part of the reception signal; and short-circuiting both end of the antenna resonance circuit at first timing in synchronization with the appearance time of the edge.

According to the present invention, the data communication device, the vehicle-mounted communication system using thereof and the data communication method make is possible to reduce a data reception error rate.

BRIEF DESCRIPTION OF THE DRAWINGS

The above and other objects, advantages and features of the present invention will be more apparent from the following description of certain preferred embodiments taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Embodiment of the present invention will be explained below referring to accompanying drawings. Same or similar reference numbers refer to same, similar or equivalent elements in the drawings.

(Structure of Data Communication Device)

Figure 1:
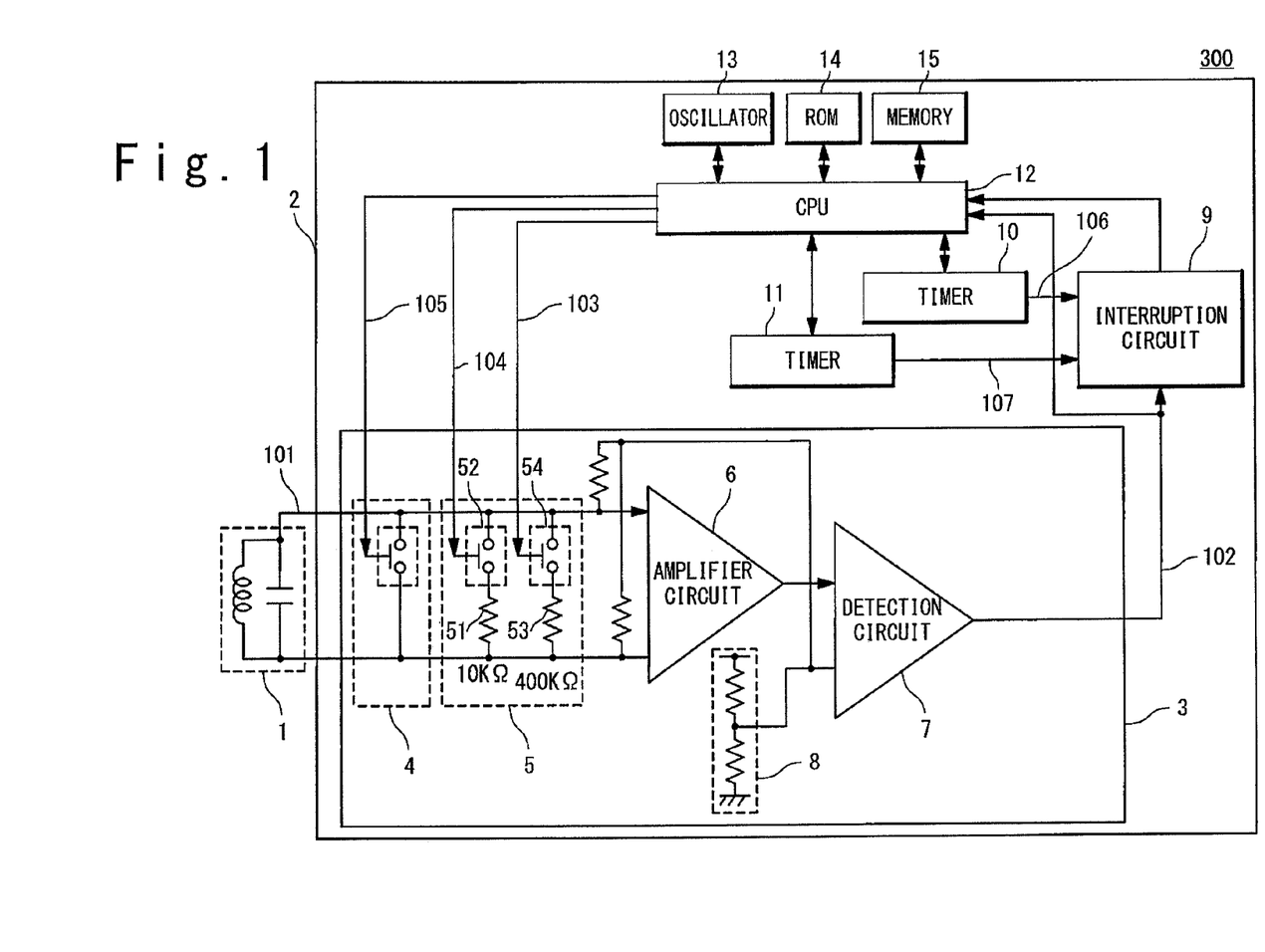
FIG. 1 is a circuit diagram showing a configuration of a data communication device according to an embodiment of the present invention.

Referring to FIG. 1, a configuration of a data communication device according to an embodiment of the present invention will be explained. In the present embodiment, explanation will be made for a data communication device 300 which obtains data by applying the Manchester encoding method to a received LF radio wave (i.e. transmission radio wave 100) which is ASK-modulated.

A data communication device 300 includes: a resonance circuit 1 which receives a radio wave (i.e. antenna resonance circuit); and a microcomputer 2. The resonance circuit 1 functions as a resonance antenna which receives an LF radio wave (i.e. transmission radio wave 100) in the ASK format. The microcomputer 2 includes: an LF receiving circuit 3 connected to the resonance circuit 1; an interruption circuit 9; timers 10 and 11; an arithmetic processing device 12 (hereinafter referred to as CPU 12); an oscillator 13; an ROM (Read Only Memory) 14; and a memory 15.

The LF receiving circuit 3 demodulates a digital baseband signal 102 from a signal received in the resonance circuit 1 (i.e. reception signal 101). More specifically, the LF receiving circuit 3 includes: a short-circuit switching circuit 4; a damping circuit 5; an amplifier circuit 6; a detection circuit 7; and a reference voltage generating circuit 8.

The short-circuit switching circuit 4 controls short-circuiting of both ends of the resonance circuit 1 in response to a short-circuit control signal 105 sent from the CPU 12. The short-circuit switching element 4 is preferably a transistor which includes a drain and a source connected to both ends of the resonance circuit 1, and a gate receiving the short-circuit control signal 105. The damping circuit 5 includes a plurality of resistors 51 and 53 connected in parallel with both ends of the resonance circuit 1. The plurality of the resistors 51 and 53 is connected to one end of the resonance circuit 1 via resistor selecting circuits 52 and 54, respectively. The resistor selecting circuit 52 controls connection (i.e. parallel connection) between the resistor 51 and the resonance circuit 1 in response to a damping control signal 104 sent from the CPU 12. The resistor selecting circuit 54 controls connection (i.e. parallel connection) between the resistor 53 and the resonance circuit 1 in response to a damping control signal 103 sent from the CPU 12. The resistor selecting circuit 52 is preferably a transistor which includes a drain and a source respectively connected to one end of the resonance circuit 1 and one end of the resistor 51, and a gate receiving the short-circuit control signal 104. The resistor selecting circuit 54 is preferably a transistor which includes a drain and a source respectively connected to one end of the resonance circuit 1 and one end of the resistor 53, and a gate receiving the short-circuit control signal 103. Preferably, a resistance value of the resistor 51 is different from that of the resistor 53. For example, the resistance value of the resistor 51 is smaller than that of the resistor 53. In this case, if the resistor 53 having the large resistance value is parallel-connected to the resonance circuit 1, the reception intensity will increase as described in the Patent Document 1. On the other hand, if the resistor 51 having the small resistance value is parallel-connected to the resonance circuit 1, the reception intensity will decrease.

The amplifier circuit 6 amplifies a voltage (i.e. reception signal 101) between both ends of the resonance circuit 1, and outputs the amplified voltage to the detection circuit 7. The detection circuit 7 compares the amplified voltage outputted from the amplifier circuit 6 with a reference voltage supplied from the reference voltage generating circuit 8. The detection circuit 7 outputs a comparison result as a detection output (i.e. digital baseband signal 102). That is, the detection circuit 7 demodulates the digital baseband signal 102 based on the received signal in the ASK format.

The timers 10 and 11 count a period in which the digital baseband signal 102 (hereinafter referred to as baseband signal 102) is in a high level state based on a control of the CPU 12. The timer 10 also outputs an interruption signal (i.e. timer interruption generating signal 106) to the interruption circuit 9 after counting a predetermined period of time. Similarly, the timer 11 also outputs an interruption signal (i.e. timer interruption generating signal 107) to the interruption circuit 9 after counting a predetermined period of time. The interruption circuit 9 outputs an interruption signal for short-circuiting both ends of the resonance circuit 1 to the CPU 12 in response to the timer interruption generating signal 106 from the timer 10. That is, the timer 10 determines timing to short-circuit both ends of the resonance circuit 1. The interruption circuit 9 also outputs an interruption signal for carrying out level determination to the CPU 12 in response to the timer interruption generating signal 107 from the timer 11. That is, the timer 11 determines timing for level determination in the CPU 12.

The CPU controls each block arranged in the microcomputer 2. More specifically, the CPU 12 outputs the short-circuit control signal 105 in response to the interruption signal from the interruption circuit 9 in order to control both ends of the resonance circuit 1 to be short-circuited and/or opened. The CPU 12 also carries out level determination for the baseband signal 102 in response to the interruption signal sent from the interruption circuit 9 to read data "0" and/or "1". The CPU 12 further outputs the damping control signals 103 and 104 for selecting a resistor to be connected in parallel with the resonance circuit 1 on the basis of a period of time (i.e. a period of time during which the digital baseband signal 102 is in a high level state) counted by the timers 10 and 11. The CPU 12 controls the timer 10 to perform the counting operation based on the baseband signal 102 so as to obtain a count value (i.e. measured time) from the timer 10. The CPU 12 also controls the timer 11 to perform the counting operation based on the baseband signal 102 so as to obtain a count value (i.e. measured time) from the timer 11. The CPU 12 is made to operate based on a clock signal from the oscillator 13 and execute a program stored in the ROM 14. Data read from the baseband signal 102 (i.e. transmission radio wave 100) is stored in the memory 15.

(Format of Radio Wave)

Next, a format of the transmission radio wave 100 received by the data communication device 300 according to the present invention and a data value read therefrom will be explained with reference to FIGS. 2, 3A and 3B.

Figure 2:
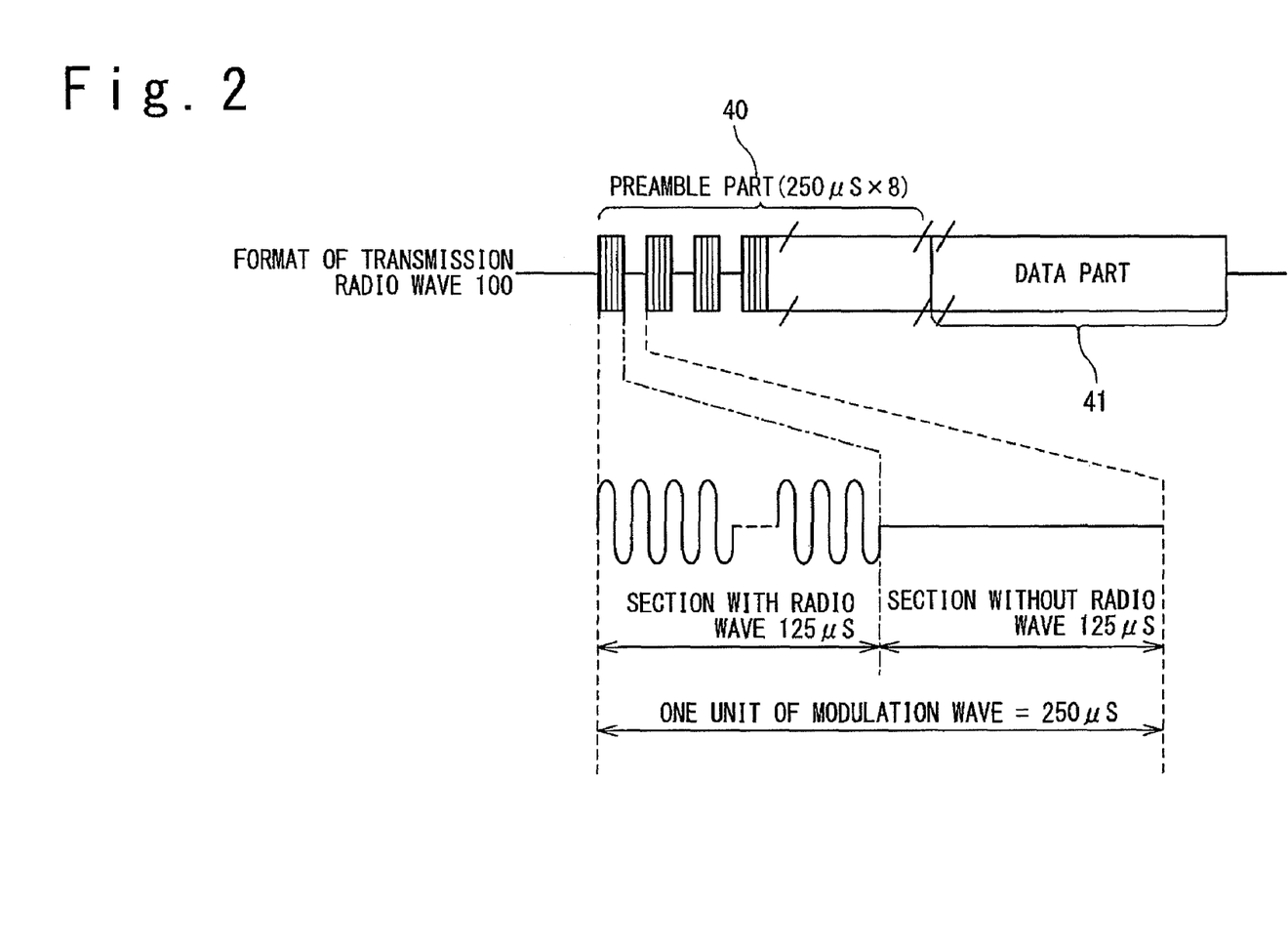
FIG. 2 shows one example of a format of a transmission radio wave according to the present invention.

FIG. 2 shows one example of a format of the transmission radio wave 100. The transmission radio wave 100 is a LF radio wave, in which a carrier wave is ASK-modulated by using a digital baseband signal transmitted from other communication device (e.g. sensor initiator 204 shown in FIG. 7). As shown in FIG. 2, the transmission radio wave 100 includes a preamble part 40 as preparatory data for receiving data, and a data part 41 as a transmission data main part.

The preamble part 40 includes eight of units. Each unit has a period of 125 μs in which a radio wave exist (i.e. section with a radio wave) and a period of 125 μs in which a radio wave does not exist (i.e. section without a radio wave) as one unit of a modulation wave (i.e. 250 μs). That is, a section with a radio wave and a section without a radio wave, each of which has 125 μs (microseconds), are exist alternately in the preamble part 40. Here, one unit of the modulation wave corresponds to a period which is the same as one period (one cycle) of the digital baseband signal as the modulation wave.

Figure 3A:
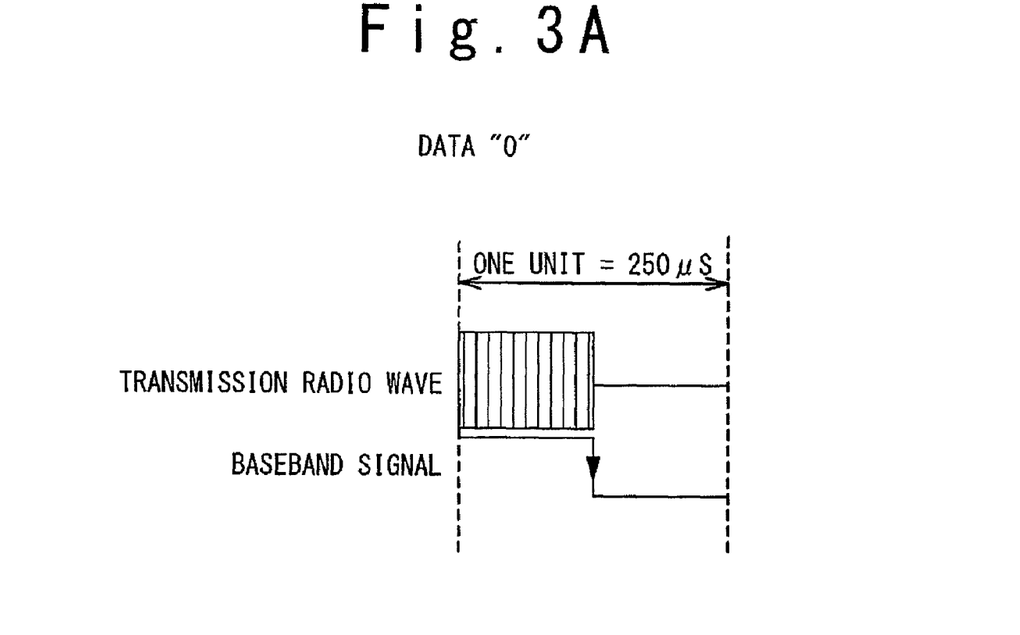
FIG. 3A shows a format of a transmission radio wave with data "0" according to the present invention.
Figure 3B:
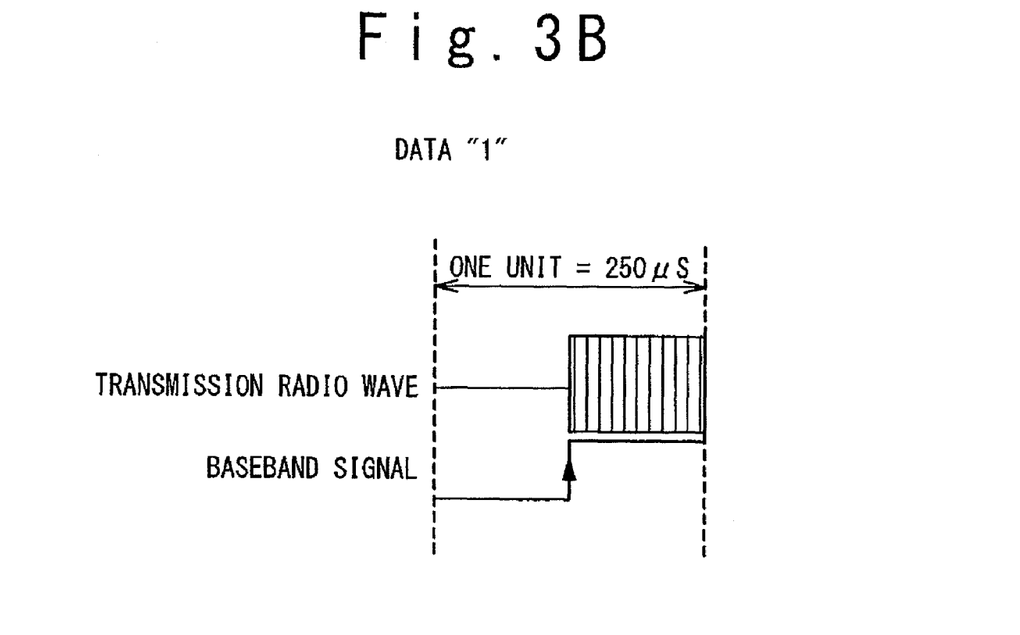
FIG. 3B shows a format of a transmission radio wave with data "1" according to the present invention.

FIG. 3A shows a format of a radio wave which is read as a data value "0". If one unit of a modulation wave includes a section with a radio wave in a first half of 125 μs and a section without a radio wave in a second half of 125 μs, a demodulated digital baseband signal exhibits transition from a high level to a low level in one unit of the modulation wave. If a digital baseband signal demodulated from a transmission radio wave thus has a falling edge in one unit of a modulation wave, a data value is determined as "0". FIG. 3B shows a format of a radio wave which is read as a data value "1". If one unit of a modulation wave includes a section without a radio wave in a first half of 125 μs and a section with a radio wave in a second half of 125 μs, a demodulated digital baseband signal exhibits transition from a low level to a high level in one unit of the modulation wave. If a digital baseband wave demodulated from a transmission radio wave thus has arising edge in one unit of a modulation wave, a data value is determined as "1".

The data communication device 300 confirms eight of modulation wave units of the preamble part 40 as a preparatory period for receiving data, and then starts to read data included in the data part 41. The preamble part 40 includes eight of consecutive data "0". The data communication device 300 therefore starts to read data from the data part 41 after confirming the eight consecutive data "0". The data part 41 includes a radio wave in a format corresponding to the data value "0" and/or "1".

(Data Receiving Operation)

The data communication device 300 according to the present invention discharges electric charges accumulated in the resonance circuit 1 by short-circuiting both ends of the resonance circuit 1 at predetermined timing. It is therefore made possible to reduce an error occurring in reading data due to electric charges accumulated in the resonance circuit 1. Level determination for reading reception data is also carried out at predetermined timing (i.e. carried out twice for one unit of a modulation wave) instead of being carried out constantly. In the data communication device 300 according to the present invention, timing to short-circuit both ends of the resonance circuit 1 and timing to carry out level determination for the reception data in the data part 41 are determined during a period to read the preamble part 40, namely in a preparatory period prior to read data (i.e. 250 μs×8).

Referring to FIGS. 4A to 6, a data receiving operation of the data communication device 300 according to an embodiment of the present invention will be explained.

Figure 4A:
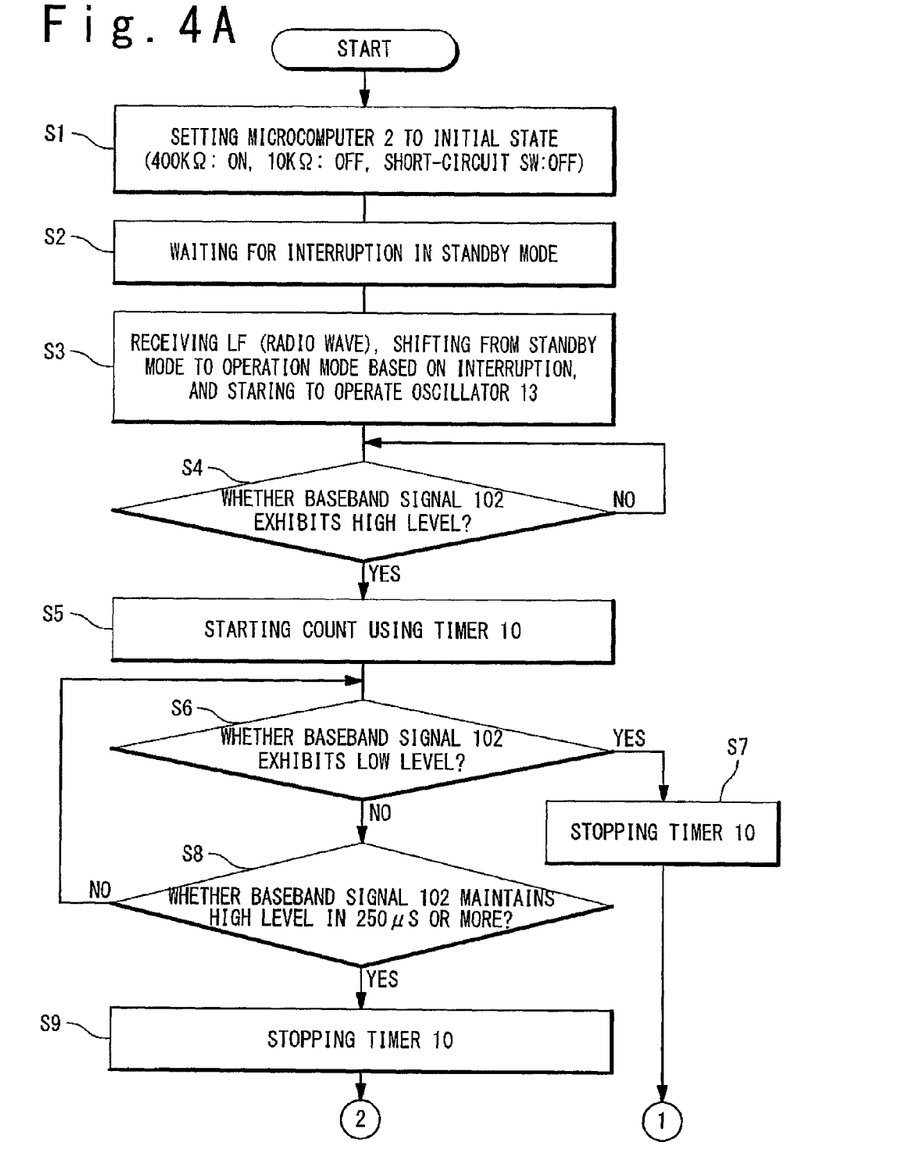
FIG. 4A is a flowchart showing an operation of a data receiving process according to an embodiment of the present invention.
Figure 4B:
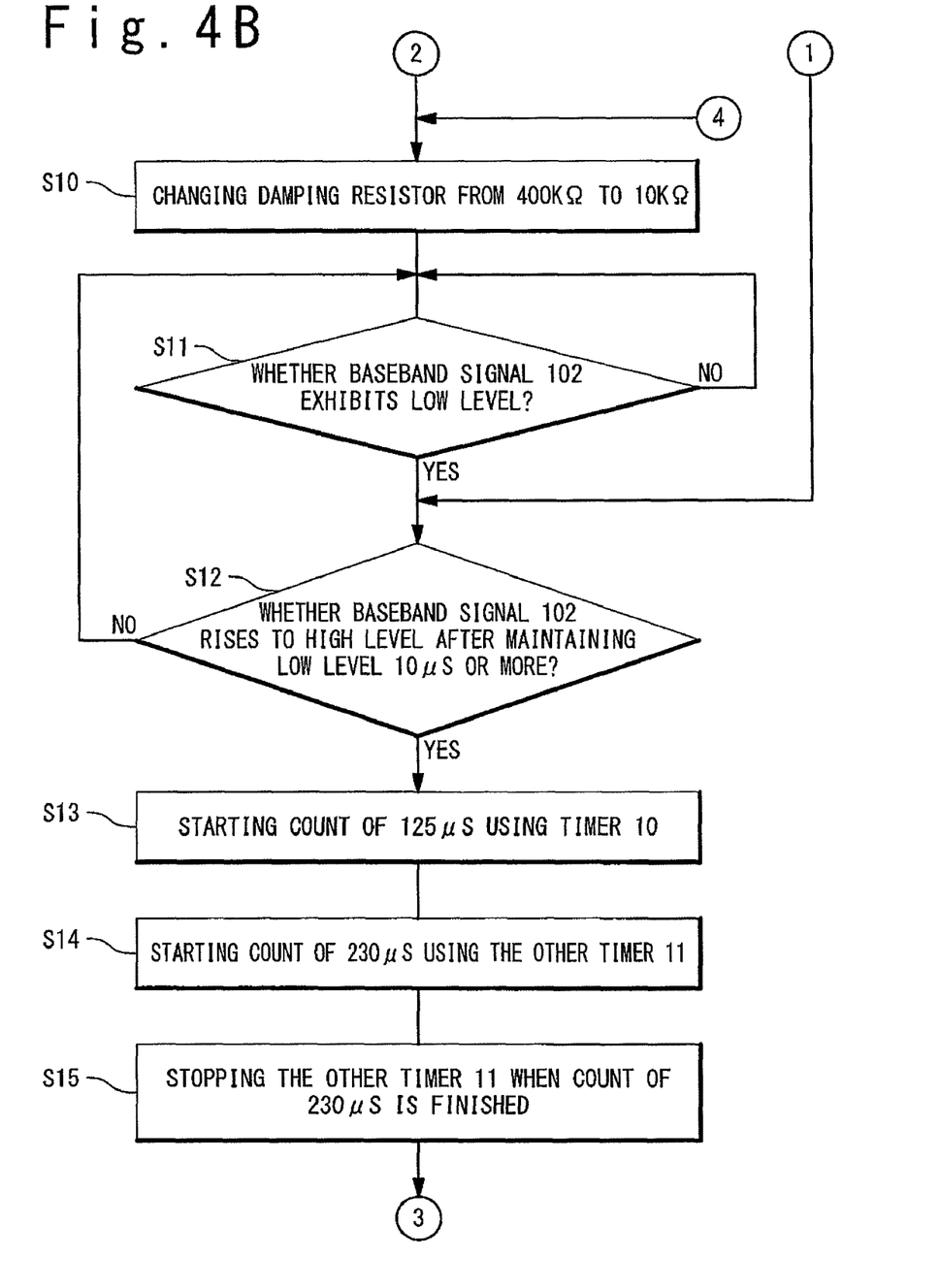
FIG. 4B is a flowchart showing an operation of the data receiving process according to the embodiment of the present invention.
Figure 4C:
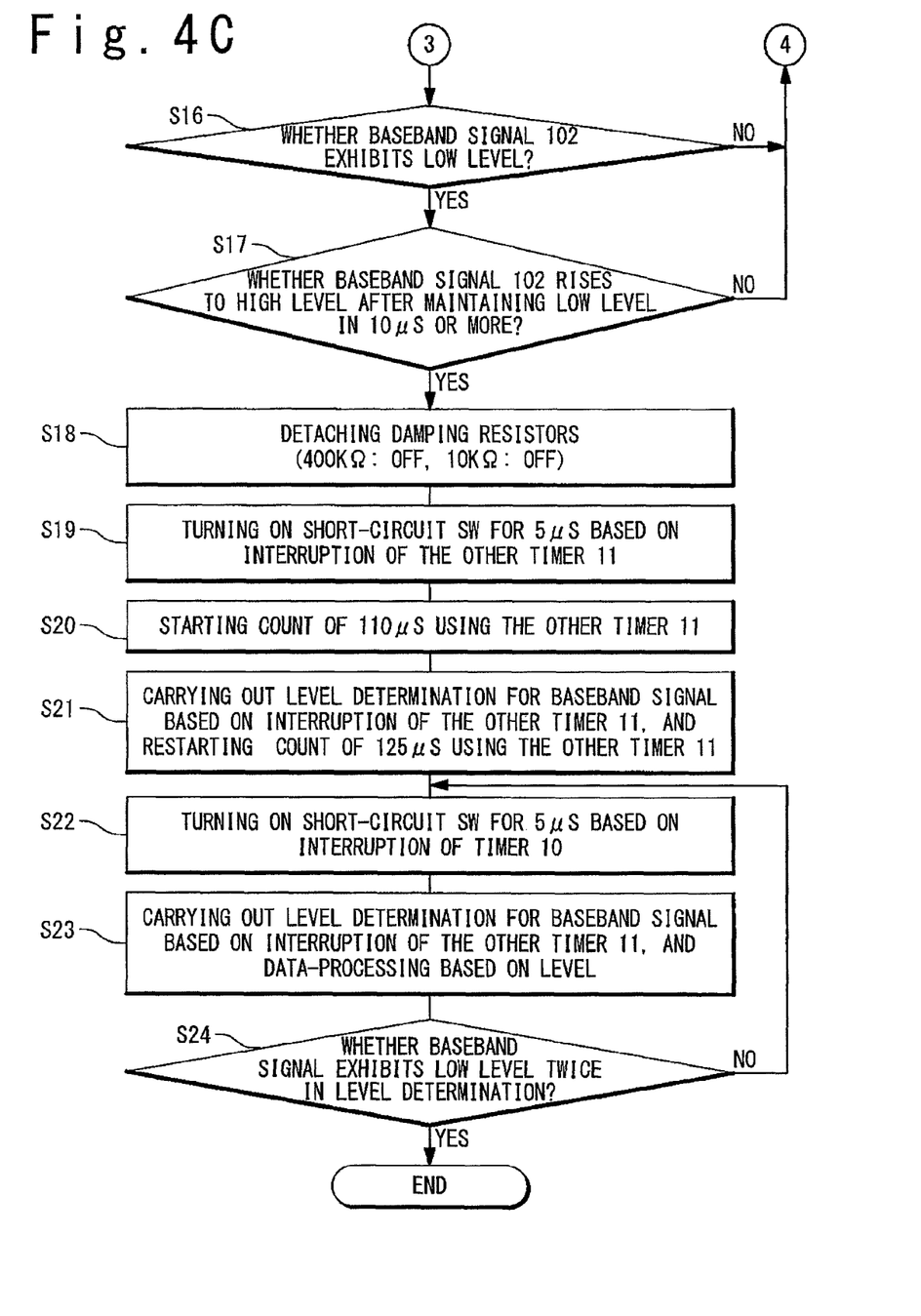
FIG. 4C is a flowchart showing an operation of the data receiving process according to the embodiment of the present invention.
Figure 5:
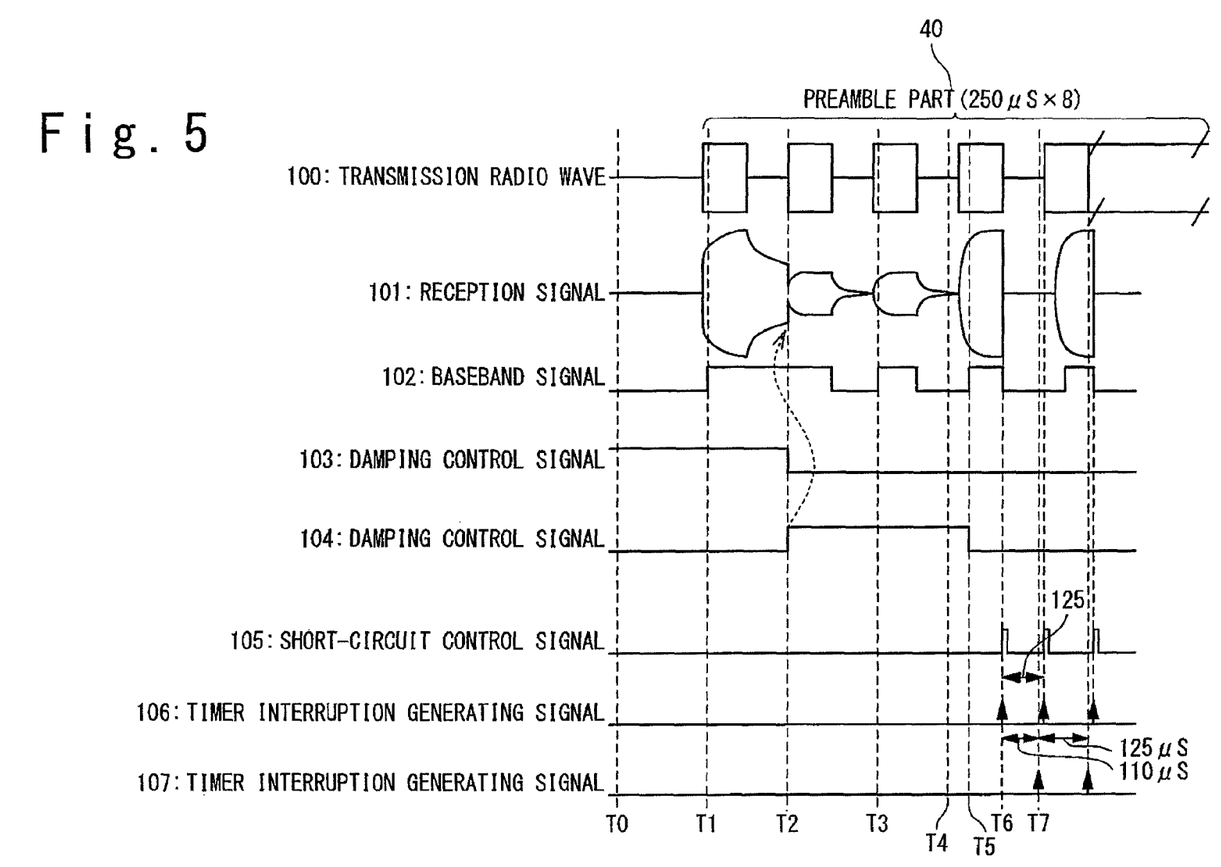
FIG. 5 is a time chart showing one example of an operation to determine short-circuit timing and level determination timing in the data receiving process according to the present invention.

FIGS. 4A to 4C are flowcharts showing an operation to determine short-circuit timing and level determination timing according to the present invention. FIG. 5 is a view showing one example of a time chart indicating an operation to determine short-circuit timing and level determination timing according to the present invention (regarding the preamble part 40, the transmission radio wave 100, the reception signal 101, the baseband signal 102, the damping control signals 103 and 104, the short-circuit control signal 105, and the timer interruption generating signals 106 and 107).

The microcomputer 2 is set to maintain an initial value until an interruption signal is supplied on the basis of detecting reception of a radio wave (step S1, time T0). Here, the resistor selecting circuit 54 is turned on in response to the damping control signal 103, and a resistor to be connected in parallel with the resonance circuit 1 is set to the resistor 53 serving as a default (to provide a best sensitivity state, e.g. 400KΩ). The resistor selecting circuit 52 is turned off in response to the damping control signal 104, and the resistor 51 with a small resistance value (to provide worst sensitivity state, e.g. 10KΩ) is detached from the resonance circuit 1.

After initial setting, the microcomputer 2 is brought into an interruption waiting state in a standby mode (step S2, from time T0 to time T1).

When the transmission radio wave 100 is received in the resonance circuit 1, the microcomputer 2 is shifted from the standby mode to an operation mode by occurrence of interruption, and the oscillator 13 is started to operate (step S3, time T1). More specifically, the detected baseband signal 102 rises corresponding to a section with a radio wave in the transmission radio wave 100. The interruption circuit 9 outputs an interruption signal to the CPU 12 in response to the rise of the baseband signal 102. The input of the interruption signal triggers the CPU 12 to be activated and the microcomputer 2 is switched from the standby mode to the operation mode. The operation mode causes the oscillator 13 to start oscillation.

In the operation mode, the CPU 12 monitors the baseband signal 102 sent from the LF receiving circuit 3 and determines whether or not the baseband signal 102 exhibits a high level (step S4). If the baseband signal 102 is determined to exhibit a high level in the step S4, the timer 10 is controlled by the CPU 12 so as to start counting (step S4: Yes, S5). At this time, the CPU 12 monitors a timer value outputted from the timer 10 and confirms elapsed time.

After the timer 10 starts counting, the CPU 12 determines whether the baseband signal 102 exhibits a low level (step S6). If the baseband signal 102 is determined to exhibit a low level in the step S6, the timer 10 is controlled by the CPU 12 to stop counting (step S6: Yes, S7). After causing the timer 10 to stop, the CPU 12 is shifted to perform an operation to determine whether a period of time during which the baseband signal 102 exhibits a low level is equal to or more than 10 µs (step S12).

While the baseband signal 102 maintains a high level, the timer 10 continues counting (step S8: No). The CPU 12 causes the timer 10 to stop counting after passing through 250 µs or more from the start of counting (step S8: Yes, S9). That is, if the baseband signal 102 maintains a high level for a period of time equal to or more than one unit of a modulation wave (i.e. 250 µs), the timer 10 stops counting. One unit of a modulation wave in the preamble part 40 is supposed to include a high level of 125 µs followed by a low level of 125 µs as stated above. However, in the case where reception intensity is high in the resonance circuit 1, the baseband signal 102 may occasionally exhibit a high level in a section in which a low level should be obtained. In the present invention, a case in which data reading is difficult due to high reception intensity can be detected by determining whether or not a high level period maintained in the baseband signal 102 exceeds a predetermined period of time (i.e. unit section of a modulation wave here) in the preamble part 40.

After causing the timer 10 to stop in the step S9, the CPU 12 changes a damping resistor to be connected in parallel with the resonance circuit 1 (step S10). Here, the resistor 53 with a high resistance (400KΩ) is switched to the resistor 51 with a low resistance (10KΩ). Referring to FIG. 5, at time T2 at which a high level state corresponds to 250 µs or higher, the CPU 12 switches a signal level in each of the damping control signal 103 and the damping signal 104. Therefore, the resistor 51 is connected in parallel with the resonance circuit 1 and the resistor 53 is detached from the resonance circuit 1. Since the damping resistor is reduced, amplitude (or reception intensity) in the reception signal 101 in the resonance circuit 1 is reduced, whereby reception sensitivity is decreased.

In the present embodiment, a control is made so that the damping resistor is switched when a high level period in the baseband signal 102 is equal or more than 250 µs. However, the present invention is not limited to this case. Since a section with a radio wave and a section without a radio wave are present alternately in the preamble part 40, it is possible to determine that reception sensitivity is too large if the baseband signal 102 having a high level period longer than half the period of a modulation wave is observed. Therefore, if a high level is maintained for a predetermined period longer than half the period of a modulation wave (i.e. 125 µs here), it may be determined that a reception error occurs and a damping resistor may be switched. In this case, the CPU 12 causes connection of the resistor 51 to the resonance circuit 1 and detachment of the resistor 53 from the resonance circuit 1 when the timer 10 passes through 125 µs+t (t is a preset period of time).

After switching the damping resistor connected to the resonance circuit 1, the CPU 12 determines whether or not the baseband signal 102 exhibits a low level (step S11). If a low level is determined in the step S6 or the step S11, the CPU 12 detects a rising edge of the baseband signal (step S12). Here, it is determined whether the baseband signal exhibits a high level after maintaining a low level period, which appears before and/or after switching the damping resistor, for 10 µs or longer. If a low level is determined in the step S6 or S11, the CPU 12 uses a timer realized by a program or the timer 11 to start measurement of a low level period (step S6: Yes or S11: Yes). Then, when the baseband signal 102 reaches a high level, a measured low level period is confirmed (step S12). At this time, if the low level period is less than 10 µs, the CPU 12 maintains monitoring of the baseband signal 102 until detecting a low level again (step S12: No). In contrast, if the low level period is equal to or more than 10 µs, the CPU 12 controls the timer 10 to start counting of 125 µs (step S12: Yes, S13).

In the present invention, it is possible to determine whether a high level appearing after a low level corresponds to a section with a radio wave in the transmission radio wave 100 by confirming whether a measured low level period is equal or more than a predetermined period of time (i.e. rising determination time). For example, since reception intensity of the reception signal 101 is slowly decreased due to a damping resistor (i.e. resistor 51 or resistor 53), the baseband signal 102 may occasionally repeat the low level and the high level in the vicinity of a threshold. In this case, a high level appearing after a low level is present temporarily without corresponding to a section with a radio wave in the transmission radio wave 100. Usually, a period of time in which a low level occurs in the vicinity of a threshold is less than 10 µs. Therefore, 10 µs is established as a rising determination time in the present invention, wherein a high level appearing after a low level maintained for 10 µs or longer is detected as a rising edge corresponding to a section with a radio wave. Note that 10 µs established as a low level period (i.e. rising determination time) confirmed in the step S12 in the present embodiment is not limited and any values can be established.

In step S13 and thereafter, the timer 10 is supposed to count 125 µs from a rising edge confirmed in the step S12, namely a half of one unit of a modulation wave (i.e. half the period of a modulation wave). Referring to FIG. 5, the timer 10 starts to count half the period of a modulation wave from time T3 at which a rising edge of the baseband signal 102 is detected.

The CPU 12 which detected a rising edge in the step S12 confirms a subsequent rising edge (steps S14 to S17). Here, the CPU 12 confirms whether the baseband signal 102 maintains a low level for a predetermined period of time (i.e. rising determination time) or longer at time at which a section without a radio wave (i.e. low level) next to the detected rising edge (i.e. high level) is expected to appear.

More specifically, immediately after or at the same time with counting started by the timer 10 in the step S13, the CPU 12 controls the timer 11 to start counting of 230 µs (step S14). The timer 11 is stopped when counting of 230 µs is finished (step S15). After finishing the counting by the timer 11, the CPU 12 determines whether or not the baseband signal 102 exhibits the low level (step S16). Owing to the process in the step S16, it is determined whether or not the baseband signal 102 exhibits the low level at time after passing through 230 µs from a detected rising edge, namely at time at which a section without a radio wave is expected to appear.

If the low level is determined in the step S16, the CPU 12 uses a timer realized by a program or the timer 11 to start measurement of a low level period (step S16; Yes). Then, when the baseband signal 102 reaches the high level, it is confirmed whether a measured low level period is equal to or more than a period of rising determination time (i.e. 10 µs here) (step S17). If the low level period is equal to or more than 10 µs at this time, the CPU 12 causes detachment of a damping resistor (i.e. resistor 51 or resistor 53) connected to the resonance circuit 1 (step S17: Yes, S18).

In contrast, if the low level period is less than 10 µs, the process will move onto the step S10 to cause switching to a damping resistor with a low resistance (step S17: No). In the case where the resistor 51 with a low resistance is already connected to the resonance circuit 1 at this time, the CPU 12 carries out processes in the step S11 and thereafter (i.e. rising edge confirming process) again by omitting the process in the step S10. Alternatively, in the case where the resistor 51 with a low resistance is already connected to the resonance circuit 1, the resistor 51 may also be detached in the step S10, or the data receiving process may be finished by issuing a data reception error to a transmission source of the transmission radio wave 100.

Referring to FIG. 5, one example of the processes in the steps S14 to S18 will be explained. When a rising edge is detected at time T3, low level determination is carried out at time T4 which is after passing through 230 µs from the time T3. Here, it is determined that the baseband signal 102 is in a low level. Next, a high level is detected at time T5, a low level period (i.e. period from time T4 to time T5) is confirmed whether it is equal to or more than 10 µs. Since the low level period is equal to or more than 10 µs here, the high level detected at time T5 is confirmed to be a high level corresponding to a section with a radio wave in the transmission radio wave 100. At time T5, the CPU 12 causes the resistor 51 connected to the resonance circuit 1 to be detached therefrom by inverting a signal level of the damping control signal 104.

As stated above, timing at which a unit of a modulation wave appears can be reconfirmed by detecting a rising edge corresponding to a section with a radio wave in the transmission radio wave 100 again.

When the damping resistor is detached, the CPU 12 short-circuits both ends of the resonance circuit 1 at timing in synchronization with time at which a rising edge appears (step S19, time T6). More specifically, after detaching the damping resistor in the step S18, the interruption circuit 9 outputs the timer interruption generating signal 106 to the CPU 12 every time for the timer 10 to count 250 µs. The CPU 12 outputs the short-circuit control signal 105 corresponding to the timer interruption generating signal 106 to short-circuit both ends of the resonance circuit 1 by turning on the short-circuit switching circuit 4 for a predetermined period. A period of time to short-circuit the resonance circuit 1 is established by taking into consideration a load capacitance of the resonance circuit 1 and a period of time to sufficiently discharge electric charges accumulated in the resonance circuit 1. In the present embodiment, 5 µs is established as short-circuit time.

Immediately after or at the same time with outputting the short-circuit control signal 105, the CPU 12 causes the timer 11 to start counting of a period of time (i.e. 110 µs here) to wait for level determination (step S20, time T6). The interruption circuit 9 outputs the timer interruption generating signal 107 to the CPU 12 when 110 µs is counted by the timer T11 (time T7). The CPU 12 carries out level determination for the baseband signal 102 in response to the timer interruption generating signal 107 and causes the timer 11 to start counting of 125 µs (i.e. a period corresponding to a half of one section of a modulation wave) (step S21, time T7). Thereafter, the timer 11 counts 125 µs (i.e. period corresponding to a half of one section of a modulated wave). As will be described later, the CPU 12 carries out level determination every time for the timer 11 to count 125 µs. Therefore, both ends of the resonance circuit 1 are short-circuited in every half the period of a modulation wave and level determination is carried out after 110 µs from the short-circuit.

A period of level determination waiting time counted by the timer 11 corresponds to a period of standby time from short-circuiting both ends of the resonance circuit 1 to carrying out of level determination for the baseband signal 102. Timing for level determination to obtain data from the transmission radio wave 100 is therefore determined. A period of time counted by the timer 11 in the step S20 is preferably established to correspond to a period of time, which is required for reception intensity of the reception signal 101 to exceed a threshold value from a state of discharging electric charges in the resonance circuit 1 by the short-circuit, in the case of a section with a radio wave. For example, if the resonance circuit 1 is short-circuited in a rising edge of the baseband signal 102 (i.e. section with a radio wave), the reception intensity of a reception signal is attenuated to a level close to zero, but it will exceed a threshold value after several tens of µs due to a radio wave received after opening the resonance circuit 1, and reach a level determined as a high level. It is therefore preferable to establish, as level determination waiting time in the timer 11, a period of time counted from a time at which both ends of the resonance circuit 1 are short-circuited (i.e. opened time) to a time at which a high level can be determined (i.e. several tens of µs). Moreover, intensity of the reception signal 101 obtained immediately before a falling edge (i.e. immediately before being short-circuited) is usually pulled up sufficiently by the transmission radio wave 100. It is therefore preferable to establish a period of time which is slightly shorter than a half of one unit of a modulation wave (i.e. half the period of a modulation wave) as a level determination waiting time. In the present embodiment, 110 µs is established as the level determination waiting time in the present embodiment. Therefore, level determination is carried out in the present embodiment after 110 µs from short-circuiting both ends of the resonance circuit 1.

When level determination timing is determined in the step S21, an operation to short-circuit both ends of the resonance circuit 1 and level determination for the baseband signal 102 are repeated to read data (steps S22 to S24). That is, interruption by the timer 10 causes both ends of the resonance circuit 1 to be short-circuited during 5 µs (step S22), which is followed by, after 110 µs from the short-circuit, carrying out level determination for the baseband signal 102 by the CPU 12 in response to interruption of the timer 11 (step S23). A state of having no low level determined twice within one unit of a modulation wave corresponds to a state of receiving data (step S24: No). In this case, the steps S22 and S23 are repeated to read data. Data which was read is written in the memory 15. In contrast, if a low level is determined twice consecutively within one unit of a modulation wave, the data receiving process is finished (step S24: Yes).

Figure 6:
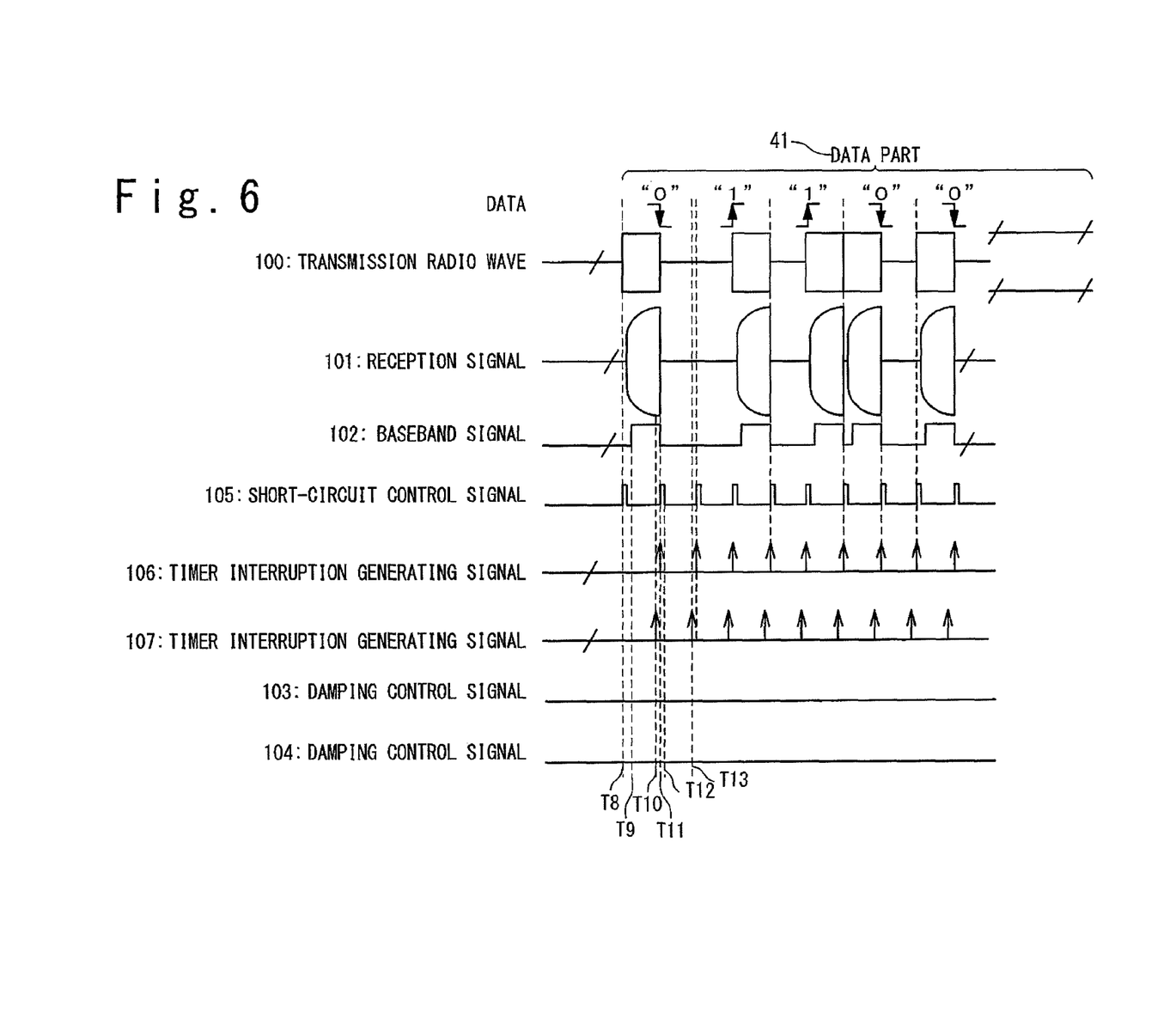
FIG. 6 is a time chart showing one example of an operation to read data in the data receiving process according to the present invention.

If a low level is confirmed eight times in the preamble part 40, the data communication device 300 reads data from the data part 41 according to the procedure shown in steps S22 to S23. FIG. 6 is a time chart showing one example of an operation to read data from the data part 41. Here, an example of a time chart is shown, in which "01100" is received.

Referring to FIG. 6, at the top of a first half period (i.e. 125 μs) in one unit of a modulation wave, the short-circuit control signal 105 is brought into a high level for a predetermined period of time (e.g. 5 μs) in response to the timer interruption generating signal 106, whereby both ends of the resonance circuit 1 are short-circuited (at time T8). Therefore, prior to input data, electric charges accumulated in the resonance circuit 1 is discharged to realize the reception signal 101 with amplitude of zero. Thereafter, the short-circuit switching circuit 4 is turned off when the short-circuit control signal 105 is brought into a low level (at time T9). If the transmission radio wave 100 corresponds to a section with a radio wave at this time, an amplitude of the reception signal 101 is increased. Since the level determination waiting time is set to 110 μs as described above, the timer interruption generating signal 107 is outputted at T10 which is after 110 μs from the short-circuit time T8 and level determination is carried out in the CPU 12. Here, a high level is determined and stored in the memory. Next, at the top of a second half period (i.e. 125 μs) in one unit of a modulation wave, the short-circuit control signal 105 is brought into a high level for a predetermined period of time (e.g. 5 μs) in response to the timer interruption generating signal 106, whereby both ends of the resonance circuit 1 are short-circuited (time T11). Therefore, electric charges accumulated in the resonance circuit 1 by a transmission radio wave in the first half period are discharged to realize the reception signal 101 with amplitude of zero. Thereafter, when the short-circuit control signal 105 is brought into a low level, the short-circuit switching circuit 4 is turned off (at time T12). In the case where the transmission radio wave 100 corresponds to a section without a radio wave, the reception signal 101 maintains a state of zero. Since the level determination waiting time is set to 110 μs in the same manner with the above case, the timer interruption generating signal 107 is outputted at time T13 which is after 110 μs from the short-circuit time T11, and level determination is carried out in the CPU 12. A low level is determined here and stored in the memory. In one section of a modulation wave, the first half period is determined to be a high level and the second half period is determined to be a low level, whereby a data value of "0" is stored in the memory.

Thereafter, level determination and data read are similarly carried out in one section of a modulation wave. At this time, in the case where one section of a modulation wave is determined to have a low level in the first half period and a high level in the second half period, a data value of "1" is stored in the memory. Moreover, in the case where two of low levels are detected in one unit of a modulation wave (i.e. no high level is detected), the CPU 12 determines that the data part 41 is finished (i.e. data communication is finished).

In reading data from the data part 41, both ends of the resonance circuit 1 are short-circuited at the aforementioned timings, namely, at the top of the first half period and at the top of the second half period in one unit of a modulation wave. Therefore, electric charges accumulated in the resonance circuit 1 is discharged in every half the period in the unit of a modulation wave, whereby occurrence of a data reading error resulting from electric charges accumulated in the resonance circuit 1 can be suppressed. It is also unnecessary to provide LFP (Low Path Filter) in the data communication device 300. Furthermore, level determination is carried out in the present invention by waiting for a period of time during which electric charges by the transmission radio wave 100 are accumulated sufficiently after electric charges release. The data communication device 300 is capable of reading data without causing a reading error.

The data communication device 300 according to the present invention is capable of reducing intensity of the reception signal 101 by the damping circuit 5. It is therefore made possible to confirm a rising edge and a falling edge of the baseband signal 102 corresponding to the preamble part 40 even in the case of having a high radio wave intensity. Owing to the timer which counts a predetermined period of a modulation wave, positions in one unit section of a modulation wave (i.e. first half period and second half period in one unit section) can be specified to determine timings for short-circuit and level determination. In the conventional technique, it was necessary to constantly monitor a detected level because one unit section in a modulation wave cannot be known. The present invention makes it possible to confirm positions in one unit of a modulation wave, so that data can be read by level determination which is carried out only twice to detect the first half and the second half in the modulation wave, thereby reducing a program load.

Figure 7:
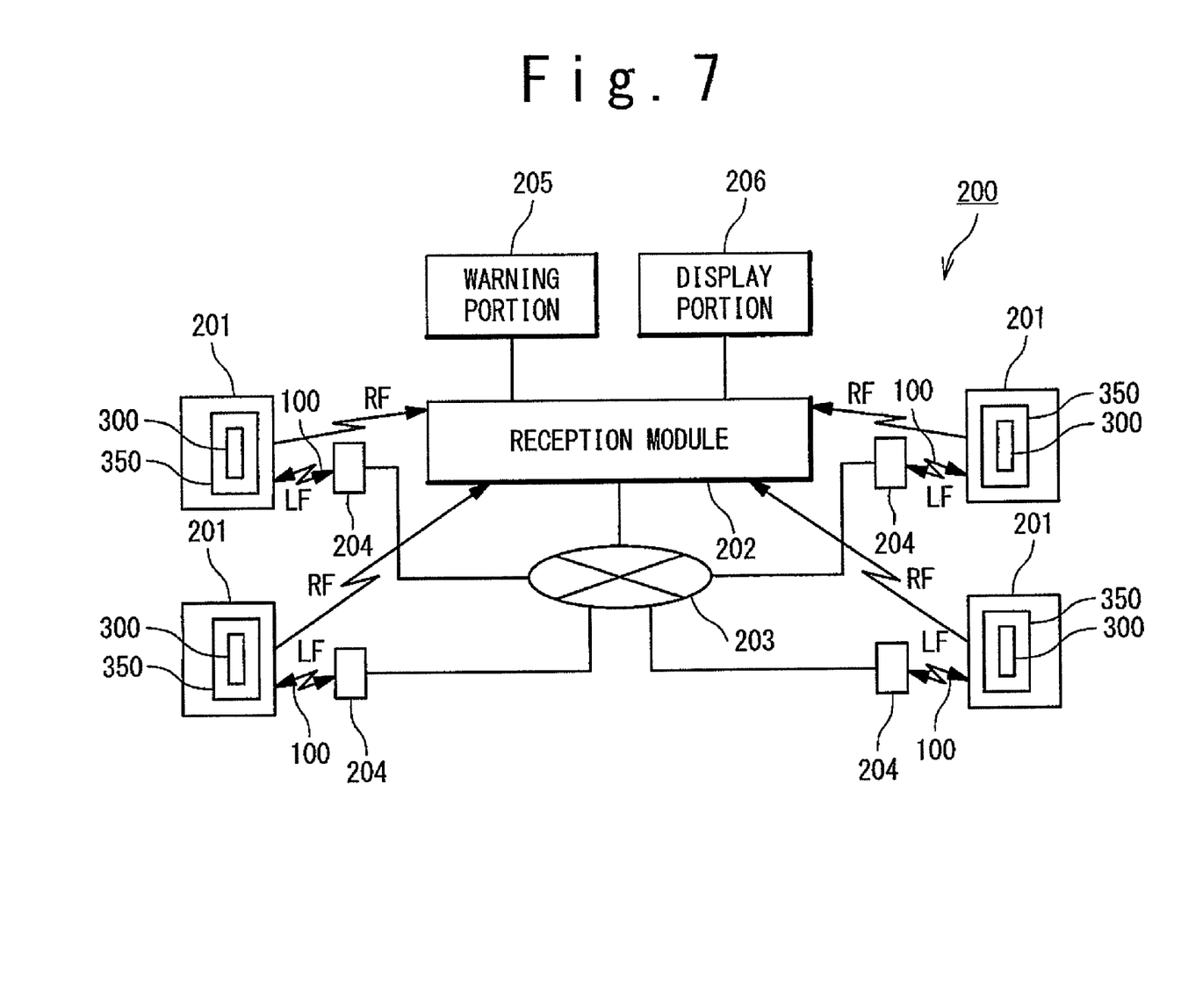
FIG. 7 shows one example showing a configuration of TPMS for mounting the data communication device according to the present invention.

The data communication device 300 according to the present invention is preferably used for, for example, TPMS (Tire Pressure Monitoring System) 200 shown in FIG. 7. In this case, the data communication device 300 is arranged in each of transmission modules 350 mounted on all tires 201 arranged in a vehicle. Each of the transmission modules 350 includes, in addition to the data communication device 300, an air pressure sensor (not shown), a temperature sensor (not shown), and a transmission means (not shown) for transmitting measured data obtained by the above sensors to a reception module 202 using an RF radio wave.

When a driver gets on a car, an RF radio wave for key less entry is transmitted from a key to the reception module 202. When an RF radio wave for key less entry is received by the reception module 202, a command signal is transmitted from the reception module 202 to each sensor initiator 204 via an in-vehicle LAN 203, in order to notify each data communication device 300 of the start-up. Then, the sensor initiator 204 ASK-modulates the command signal (baseband signal) by using an LF (i.e. 125 KHz) radio wave and transmits the modulated command signal (transmission radio wave 100) in the ASK format to the data communication device 300. Based on command data included in the demodulated command signal (baseband signal 102) obtained by each data communication device 300, each transmission module 350 is therefore started to immediately measure the air pressure and temperature of each tire by various kinds of the sensors. Information obtained by the measurement is then transmitted by the transmission means (not shown) using RF (i.e. 433 MHz and 315 MHz) radio waves as a data signal to the reception module 202 which is mounted on a vehicle body. The reception module 202 notifies a driver of information on a tire pressure by a display portion 206 such as a display device and a warning portion 205 on the basis of the received signal.

A specific structure of the present invention is not limited to the embodiment according to the present invention explained above in detail, and the present invention includes any changes made in a range without deviating from the scope of the present invention.

The present embodiment provides the damping circuit 5 arranged with the two resistors including the resistor 53 with a high resistance (i.e. 400 KΩ) and a resistor 51 with a low resistance (i.e. 10 KΩ), but it is not limited and a resistor with an intermediate value which is between the two resistors may also be arranged. For example, in receiving the transmission radio wave 100 with intermediate radio wave intensity which realizes a state such as maintaining a high level for a predetermined period of time or longer in a case of connecting the resistor 53 to the resonance circuit 1 and maintaining a low level for a predetermined period of time or longer in a case of switching to the resistor 51, a rising edge of the baseband signal 102 can be confirmed by switching to the intermediate resistor.

The data communication device 300 in the present embodiment is also provided with the two timers including the timer 10 for counting short-circuit timing and the timer 11 for counting level determination timing, but it is not limited. Since level determination timing and short-circuit timing which is set immediately after level determination are close from each other in terms of time, time therebetween may also be counted by a program. In this case, the data communication device 300 is provided with only one timer for counting the half period (i.e. 125 μs) of a modulation wave, level determination timing is determined by using the timer, and short-circuit timing is determined by counting a period of time between the level determination and a short-circuit process in a step according to the program.

Furthermore, referring to FIG. 1, an element for controlling the amplification degree of the amplifier circuit 6 from the CPU 12 may also be added to the data communication device 300. Alternatively, an element may also be employed in such that an output from the detection circuit 7 is subjected to feedback to the amplifier circuit 6 via AGC (Auto Gain Control) circuit and the amplifier circuit 6 is controlled by AGC.

Furthermore, a damping resistor (e.g. resistor 53 of 400 KΩ to realize best reception sensitivity) may also be connected in parallel with the resonance circuit 1 when data is read from the transmission radio wave 100. In this case, it is preferable to connect the damping resistor at timing prior to receive the data part 41.

It is apparent that the present invention is not limited to the above embodiment, but may be modified and changed without departing from the scope and spirit of the invention.

Although the present invention has been described above in connection with several exemplary embodiments thereof, it would be apparent to those skilled in the art that those exemplary embodiments are provided solely for illustrating the present invention, and should not be relied upon to construe the appended claims in a limiting sense.

What is claimed is:

1. A data communication device comprising:
   an antenna resonance circuit configured to receive a signal in the ASK (Amplitude Shift Keying) format, wherein said signal includes:
   a preamble part containing a modulation wave with a predetermined pattern, and
   a data part containing a modulation wave with an arbitrary pattern;
   a receiving circuit configured to demodulate a detection signal from said reception signal;
   a timer configured to output an interruption signal every time when counting a first predetermined period of time;
   an arithmetic processing device configured to be connected to said receiving circuit and to activate said timer based on a detection signal demodulated from said preamble part of said reception signal; and
   a switch configured to short-circuit both end of said antenna resonance circuit during a second predetermined period of time based on said interruption signal, wherein said second predetermined period of time is different from said first predetermined period of time.

2. The data communication device according to claim 1, further comprising:
   a storage portion configured to store data corresponding to said first predetermined period of time,
   wherein said timer outputs said interruption signal based on a counted value and said data stored in said storage portion.

3. The data communication device according to claim 1, wherein a period of the detection signal is one unit of said modulation wave, wherein said modulation wave includes:
   a first period containing an electric wave ASK-modulated in said one unit, and
   a second period not containing an electric wave in said one unit;
   wherein said first predetermined period of time is a half period of said one unit of said modulation wave.

4. The data communication device according to claim 3, wherein said arithmetic processing device activates said timer based on a first detection signal which is demodulated from said one unit of said modulation wave in said preamble part of said reception signal;
   wherein said arithmetic processing device deactivate said timer based on a second detection signal which is demodulated from a signal not-containing said first period in said one unit of said modulation wave, said second detection signal being outputted from said receiving circuit after said first detection signal.

5. The data communication device according to claim 4, further comprising:
   a plurality of resistors configured to have resistance values different from each other; and
   a resistor selection circuit configured to select a resistor from said plurality of resistors, wherein said selected resistor is parallel-connected to said antenna resonance circuit,
   wherein said arithmetic processing device outputs a selection signal based on a third detection signal in which a time period of a high level state is longer than a half period of said one unit of modulation wave,
   wherein said resistor selection circuit changes said selected resistor parallel-connected to said antenna resonance circuit from a resistor with a high resistance value to a resistor with a low resistance value based on said selection signal.

6. The data communication device according to claim 3, wherein said timer is a first timer,
   wherein said interruption signal is a first interruption signal,
   wherein said data communication device further comprising;
   a second timer configured to start a counting operation based on said first interruption signal and to output a second interruption signal every time when counting a third predetermined period of time, wherein said third predetermined period of time is different from said first predetermined period of time, wherein said arithmetic processing device executes level determination for said demodulated detection signal based on said second interruption signal.

7. The data communication device according to claim 6, wherein a time interval between an output time of said first interruption signal and an output time of said second interruption signal is shorter than a half period of said one unit of modulation wave.

8. An air pressure monitoring system comprising:
a data communication device; and
a sensor initiator configured to transmit a signal in the ASK (Amplitude Shift Keying) format to said data communication device, wherein said signal includes:
a preamble part containing a modulation wave with a predetermined pattern, and
a data part containing a modulation wave with an arbitrary pattern,
wherein said data communication device includes: an antenna resonance circuit configured to receive a signal in the ASK format,
a receiving circuit configured to demodulate a detection signal from said reception signal,
a timer configured to output an interruption signal every time when counting a first predetermined period of time,
an arithmetic processing device configured to be connected to said receiving circuit and to activate said timer based on a detection signal demodulated from said preamble part of said reception signal, and
a switch configured to short-circuit both end of said antenna resonance circuit during a second predetermined period of time based on said interruption signal, wherein said second predetermined period of time is different from said first predetermined period of time,
wherein detection of air pressure of a tire is started in response to a data based on the demodulated detection signal.

* * * * *